Patented Nov. 10, 1931

1,831,544

UNITED STATES PATENT OFFICE

WILLIAM BEACH PRATT, OF WELLESLEY, AND ROYCE JENNINGS NOBLE, OF MALDEN, MASSACHUSETTS, ASSIGNORS, BY DIRECT AND MESNE ASSIGNMENTS, TO DISPERSIONS PROCESS, INC., OF DOVER, DELAWARE, A CORPORATION OF DELAWARE

PREPARATION OF COLLOIDAL SOLUTIONS OF WATER-IMMISCIBLE BODIES

No Drawing.     Application filed December 29, 1927. Serial No. 243,467.

This invention relates to the preparation of colloidal solutions of certain liquid and solid water-immiscible bodies.

We have discovered that there are a large number of liquid and normally solid water-immiscible bodies, including the oils, fats, waxes, resins, gums, and bitumens, which are miscible under certain conditions with a hydrophilic colloid such as soap, sulphonated oil, or sulphonic acid, such as phenol sulphonic acid, resulting in true solutions of such water-immiscible bodies and the hydrophilic colloid. We have further discovered that a true solution of this character is capable of dissolving only a limited amount of water, and when treated with more than this amount, undergoes a change of phase, yielding a colloidal aqueous solution of the water-immiscible body. When this change of phase is effected, the hydrophilic colloid which is distributed throughout the water-immiscible body goes into colloidal solution in the water, and there results a colloidal solution of the water-immiscible body, in which solution such water-immiscible body exists as particles of substantially uniform size and of the smallest colloidal size producible in such solution. The colloidal solution of the water-immiscible body thus produced is extremely stable, and in the case of colloidally dissolved thermoplastic bodies such as wax, is even stable at temperatures above the melting point of the wax, as each colloidal particle of wax is enveloped by a film of the hydrophilic colloid, which prevents agglomeration of the particles even while they are in a melted condition. The smallest particles producible in the aqueous solution of the hydrophilic colloid will vary in different cases, depending upon the particular hydrophilic colloid and water-immiscible body employed, as well as their relative proportions, it being possible that the particles of different hydrophilic colloids and water-immiscible bodies may be of various sizes and may exist as single molecules, molecular aggregates, polymers, or aggregates of polymers. In any case, however, the smallest particles producible under the particular conditions existing will result, for as the hydrophilic colloid goes from true solution into colloidal aqueous solution, the water-immiscible body forms colloidal particles of minimum size consistent with sufficient envelopment with hydrophilic colloid to prevent their aggregation. In the case of a colloidal solution of japan wax containing about 10% soap based on weight of wax, for example, microscopic examination indicates a particle size of wax definitely smaller than the particle size of the rubber globules in rubber latex. In the case of a colloidal solution of linseed oil containing about the same relative quantity of soap, the particles of oil apparently approach molecular size, since a relatively dilute solution is substantially clear.

Inasmuch as a large variety of water-immiscible bodies and hydrophilic colloids are suitable for the preparation of colloidal solutions by the process of the present invention, it is evident that we may produce a large variety of colloidal solutions adapted for various industrial uses, e. g., for the sizing or waterproofing of paper, felts, or textile fabrics and other fibrous materials, for the treatment of leather, for the lubrication of threads, and for the polishing or finishing of floors or other surfaces.

In carrying out the process of the present invention, when the hydrophilic colloid and the water-immiscible body are not miscible at ordinary temperatures to produce a true solution, they are heated, in the absence of water sufficient to constitute such water the continuous phase, to a temperature at which they become perfectly miscible and yield a true liquid solution. The presence of a slight or adventitious amount of water is not objectionable, as this, together with the hydrophilic colloid and the water-immiscible body, form a true solution, but if excessive water is present, it should be removed as by maintaining the mixture at or above 100° C. until the excess is driven off or even until the mixture is substantially dehydrated. If a water-immiscible thermoplastic body such as a wax is employed, it is raised to a temperature above its melting point but below its temperature of decomposition or that of the hydrophilic colloid, the hydrophilic colloid being added before or after melting, and preferably being produced in situ in the melted body when such hydrophilic colloid is slowly soluble or more readily soluble only at excessive temperatures. A true liquid solution is thus first prepared in the case of both liquid and thermoplastic water-immiscible bodies, such true solution being clear or slightly opalescent in most cases. If the solution tends to stiffen or congeal to a solid or pasty condition, it is preferably maintained in melted condition while water, heated to a temperature sufficiently high to prevent the solution from stiffening or congealing, is gradually stirred thereinto in amount sufficient to effect a change of phase from a true solution to a colloidal solution of the water-immiscible body in an aqueous solution of the hydrophilic colloid as the continuous phase. If the true solution were first allowed to stiffen to a pasty or solid condition and cold water were then added, it would be much more difficult to effect a change of phase to a colloidal aqueous solution, owing to the difficulty of uniformly distributing water through a pasty or solid mass, as well as the lower rate of solubility of the hydrophilic colloid in the water at lower temperature. The change of phase is accompanied by a change in color and/or a change from a substantially clear, true solution to a more opaque, colloidal aqueous solution, so that the amount of water necessary to effect the change may be closely adjusted, and only slightly more water, than that necessary to make the water the continuous phase, may be added. Our invention thus makes possible the production of colloidal aqueous solutions containing substantially the minimum content of water, but which may be readily diluted to any desired consistency. The minimum amount of water necessary to produce the aqueous continuous phase is different for different water-immiscible bodies and hydrophilic colloids, but only about 10% to 30% water, based on the total weight of the resulting colloidal aqueous solution, is usually necessary. When substantially the minimum amount of water is used in producing a colloidal solution of a thermoplastic body which is solid at ordinary room temperature, the resulting colloidal solution, when allowed to cool to room temperature, congeals to solid condition. The cooling of a colloidal solution of a liquid body having a minimum water content generally results in a stiff paste. The solid or pasty colloidal aqueous solutions thus produced may be readily diluted with water to any desired extent, dilution being facilitated by the use of warm or hot water, as under such conditions the concentrated solution of the hydrophilic colloid is more readily diluted and the colloidal particles of the water-immiscible body more readily freed for dissemination in the diluted continuous phase. When a small lump of the solid or pasty colloidal solution, say about the size of a pea, is added to a beaker of warm or hot water, a curious phenomenon takes place, the lump disintegrating with visible activity into macroscopic particles, which again actively disintegrate into colloidal particles.

By the process of the present invention, depending upon the initial physical condition of the water-immiscible body, we are enabled to produce colloidal solutions in a highly concentrated condition, e. g., in the form of hard cakes or in the form of stiff pastes containing a minimum water content, in which condition they may be handled, stored, and transported easily and inexpensively. Such concentrated colloidal solutions are quite stable against variable atmospheric temperature conditions, even freezing weather having no deleterious effect thereon, and the evaporation of water due to atmospheric heat merely causing an inversion of phase on only the surface, if at all. Such solutions, as previously stated, may be readily diluted for use, and when the hydrophilic colloid is removed from the diluted solution as by coagulation with a suitable electrolyte, the colloidal particles of the water-immiscible body tend to agglomerate and form a continuous liquid body in the case of liquid water-immiscible bodies such as oil, and to form flocks in the case of a water-immiscible thermoplastic body such as wax. When the water is evaporated therefrom, a composition comprising the water-immiscible body and the hydrophilic colloid results, but this composition is not a true solution and is generally irreversible under ordinary temperature conditions, as many of the water-immiscible bodies herein described are brought into colloidal solution with hydrophilic colloids with difficulty, if at all, other than by first forming a true solution as herein described.

The present invention may be understood by citing certain specific examples of procedure. By practice of the following example, there results a solid colloidal solution of japan wax, which may be handled, stored, and shipped in the form of cakes, but which after dilution is suitable, among other purposes, for use as a thread lubricant. Two hundred parts (by weight) of japan wax (melting point 52.5° to 54.5° C.) is heated as on a water bath to a temperature above its melting point, say 90° C., whereupon 20 parts of a suitable soap, e. g., potash-olive soap, is gradually added with stirring into the wax,—the stirring being continued until a clear, light-brown liquid results. The true wax-soap solution thus produced may be removed from the water bath and cooled to, say, 60° to 75° C., whereupon water, say at 60° to 75° C. is slowly added and stirred into the solution in amount sufficient to effect a change of phase, this being accompanied by a change from a true solution to a colloidal aqueous wax solution resembling milk in appearance. About 40 parts of water is sufficient to make the aqueous soap solution, this amount being slightly in excess of that necessary to make the water the continuous phase of the resulting colloidal composition. When a colloidal solution thus prepared is allowed to cool to room temperature, it congeals into a relatively hard, light-yellow, solid mass. This solid colloidal solution may be readily diluted with water, dilution being facilitated by comminuting or flaking it and by using warm or hot water. The diluted colloidal wax solution resembles milk in appearance, and upon the addition of a suitable electrolyte or coagulant such as alum, the soap is coagulated and the wax particles agglomerate into flocks which float to the surface of the water.

Other waxes, such as beeswax (yellow or white), candelilla, paraffin, montan, and carnauba, may be colloidally dissolved, using the same general procedure, and in each case first preparing a true solution of the soap and wax and then treating the solution while maintaining it in liquid condition with sufficient water to effect a change of phase. If in any case the soap or the mixture of soap and wax carries more water than that permitting the production of a true wax-soap solution, the molten wax-soap mixture will be cloudy, in which case the excess water is driven off by heating slowly to 100° C., or above, and maintaining the mixture at this temperature until it clears, whereupon it may be cooled somewhat, but not below the melting point of the wax, and sufficient water at the desired temperature added to effect a change of phase, as previously described. If the soap and wax dissolve slowly, it is preferable to produce the soap in situ in the wax rather than to use it in prepared condition, as nascent soap dissolves more readily. A procedure thus practiced may be substantially as follows. One hundred parts of Montan wax (melting point about 70° C.) and 15 parts of stearic acid are heated together to about 90° C., whereupon concentrated ammonia or other alkali, preferably sufficiently low in water content to permit the production of a true solution of the resulting soap and the wax, is added to the melted mixture. The resulting true liquid solution is then treated with water at the desired temperature, producing a colloidal wax solution of a wax content of, say, 70%, whereupon the solution may be allowed to congeal to a solid condition. If desired, a mixture of liquid and thermoplastic water-immiscible bodies, e. g., a mixture of castor oil and japan wax, may be colloidally dissolved, in which case the oil is preferably uniformly disseminated or distributed throughout the wax by thorough stirring, before forming a true solution of the mixture with the soap, as under such conditions a more uniform colloidal solution results, in which each colloidal particle of wax carries a substantially equal amount of oil.

Substantially the same procedure is followed in the case of oils alone, e. g., castor, neat's-foot, linseed, and paraffin, as in the case of thermoplastic bodies, the oil being heated with, say, 10% to 15% soap at a sufficiently elevated temperature to produce a true solution and sufficient water being added to the true solution while maintaining it in liquid condition to effect a change of phase. The colloidal solutions thus produced when allowed to cool to room temperature generally congeal into a stiff paste.

Some water-immiscible bodies, e. g., rosin and paraffin, are difficultly miscible with hydrophilic colloids such as soap alone, to produce true solutions. We have discovered that a mixture of a hydrophilic colloid such as soap and non-aqueous mediums, such as the alcohols, e. g., glycerine, certain of the sugars, e. g., glucose, and certain of the fatty acids, e. g., oleic acid, have a highly solvent action, and consequently where this difficulty occurs, we use a mixture of the hydrophilic colloid and the non-aqueous medium in various proportions to form true solutions with such water-immiscible bodies. The mixture of the hydrophilic colloid and the non-aqueous medium is more solvent than either component, much in the same way that a mixture of ether and alcohol forms a solution with nitrocellulose more readily than either the ether or alcohol alone. The resulting liquid solution, when treated with sufficient water, while being maintained in liquid condition, undergoes a change in phase, and in the case of a water-soluble, non-aqueous medium such as glycerine, the glycerine going into true solution in the water, and the water-immiscible body going into colloidal solution in the water-glycerine solution. Even with the glycerine present therein, the resulting colloidal solution when cooled to room temperature yields a solid mass in the case of thermoplastic bodies such as rosin, and a stiff, pasty mass in the case of liquid bodies such as paraffin oil, the glycerine serving to retard evaporation from the surface of the mass. Where glycerine is employed to facilitate the production of a true solution of the soap and the water-immiscible body, it may be advantageous to produce a soap in situ in the body, using a fatty acid glyceride such as the glyceride of stearic and/or oleic acids, as under such conditions the glycerine desired is liberated during saponification in situ in the mass. The heat necessary to effect the saponification is furnished during the preparation of the true solution, this heat being usually adequate for that purpose, but more heat may be applied, if necessary.

Various proportions of the soap and the water-immiscible body, as well as the glycerine, may be employed, the proportions in each case depending upon the characteristics of the particular raw materials employed and the characteristics of the colloidal solutions which it is desired to produce, the proportions given in the examples being illustrative only.

Our method of producing colloidal solutions of water-immiscible bodies represents a distinct advance over the methods heretofore employed, as such latter methods involve a direct addition of the water-immiscible body to the aqueous solution, under which conditions the size of the resulting particles depends to a great extent on the degree of mechanical manipulation or agitation during such addition. According to our method, on the contrary, the size of the colloidal particles is not dependent upon the mechanical manipulation or agitation employed while forming the colloidal solution, since little stirring is necessary when water is added to the true liquid solution of the soap and the water-immiscible body to effect a change of phase. In previous practice, the attempt is to convert agglomerates or masses of the water-immiscible body by subdivision into small particles, in which case particles of various sizes are likely to result; whereas we form exceedingly minute colloidal particles of substantially uniform size from a molecular or semi-molecular condition of the water-immiscible body.

Owing to the lack of a better generic term, by the phrase "water-immiscible body" as employed in the specification and in the appended claims, we do not mean to include bodies such as metals, or other bodies which melt at a temperature above the temperature of decomposition of a hydrophilic colloid such as soap, nor do we mean to include rubber, balata, gutta percha or other coagulated latices, or cellulose, but we mean to include oils of mineral, vegetable, and animal origin, as well as fats, waxes, resins (both natural and synthetic), gums, bitumens, and bodies of any suitable origin, which are miscible under the conditions herein described with a hydrophilic colloid such as soap or a mixture of soap and a non-aqueous medium such as glycerine to form true solutions.

By the expression "true solution" as herein used, we mean a substantially clear mixture of a hydrophilic colloid and a water-immiscible body, in which the particles of each of these components exist as the smallest particles which can exist in a mutual diffusion of these components, quite irrespective of whether such particles exist as molecules, polymers, molecular aggregates, or aggregates of the polymers. We wish also to include in this definition true solutions of bitumens, asphalts and other bodies, which, owing to their content of finely divided carbon or other material, are incapable of yielding clear solutions. It is our discovery that we may produce such true solutions and then convert such diffused particles of the water-immiscible body of such true solutions directly into the internal or disperse phase of an aqueous solution, by the mere addition of water to such true solutions.

Having thus described certain embodiments of this invention, it is evident that various changes and modifications might be made therein without departing from the spirit or scope of invention as defined by the appended claims.

What we claim is:

1. A normally solid composition, comprising a colloidal solution of japan wax in an aqueous soap solution, said solution containing only about 10% soap, based on the weight of the wax, and only about 15% water, based on the total weight of the composition.

2. A composition of matter comprising a colloidal solution of a wax in an aqueous soap solution, said solution containing only about 10% soap, based on the weight of wax, and only about 15% water, based on the total weight of the composition.

In testimony whereof we have affixed our signatures.

WILLIAM BEACH PRATT.
ROYCE JENNINGS NOBLE.